No. 665,809.   
E. J. STILES.  
BUCKET HANDLE.  
(Application filed June 14, 1900.)  
(No Model.)

Patented Jan. 8, 1901.

Witnesses  
Inventor  
E. J. Stiles  
Attorneys

THE NORRIS PETERS CO., PHOTO-LITHO., WASHINGTON, D. C.

UNITED STATES PATENT OFFICE.

ERNEST J. STILES, OF BRIDGTON, MAINE.

BUCKET-HANDLE.

SPECIFICATION forming part of Letters Patent No. 665,809, dated January 8, 1901.

Application filed June 14, 1900. Serial No. 20,350. (No model.)

*To all whom it may concern:*

Be it known that I, ERNEST J. STILES, a citizen of the United States, residing at Bridgton, in the county of Cumberland and State of Maine, have invented certain new and useful Improvements in Bucket-Handles; and I do declare the following to be a full, clear, and exact description of the invention, such as will enable others skilled in the art to which it appertains to make and use the same.

This invention relates to improvements in devices for holding milk-pails while milking to insure the safety of the pail and its contents and relieve the milker from the fatigue of holding the milk-pail between the knees, as ordinarily practiced.

The object of the invention is to provide a construction whereby the use of independent holding-bands and other cumbersome attachments may be dispensed with and the pail holding or supporting device made to form part of the bail-handle, the handle and supporting devices being constructed of a single piece of wire or other suitable material.

With this and other minor objects in view the invention consists in a device such as described embodying novel features of construction, combination, and arrangement of parts, as will be hereinafter more fully described and particularly pointed out in the appended claims.

Figure 1:
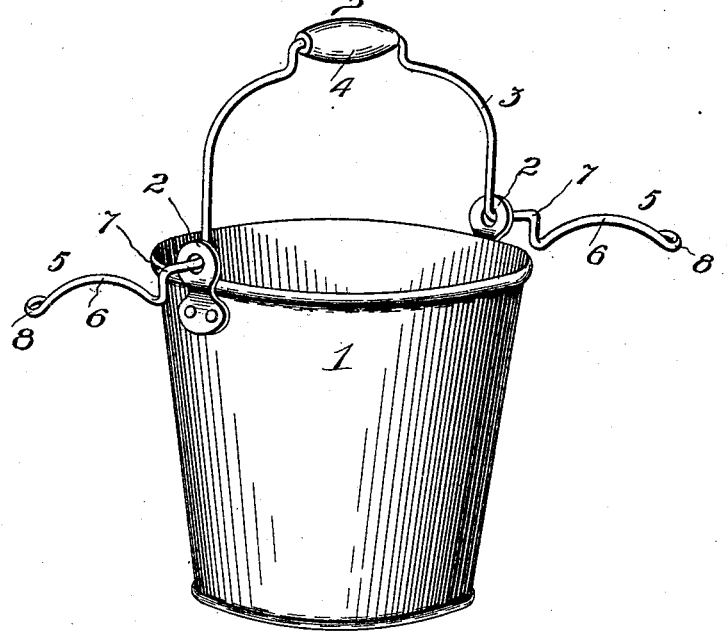
Figure 2:
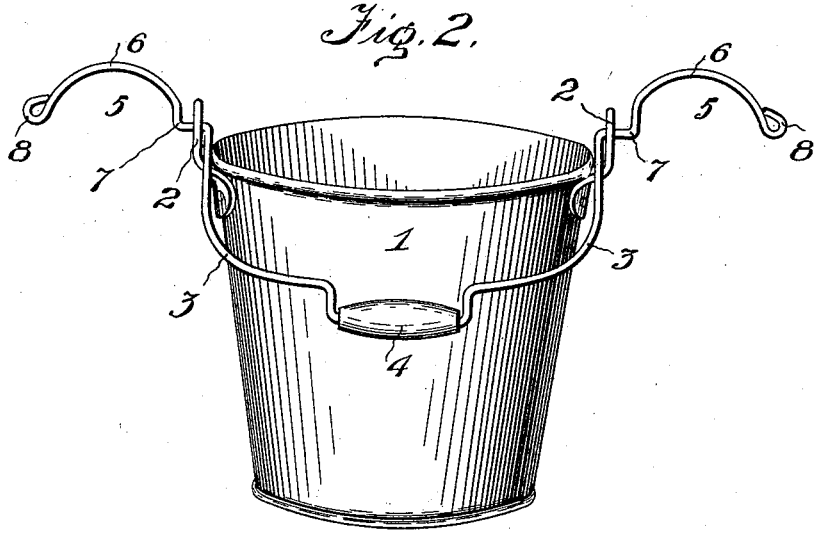

In the drawings hereto attached and forming a part of this specification, Figure 1 is a perspective view of a milk-pail embodying my invention, showing the bail-handle elevated for carrying the pail. Fig. 2 is a similar view showing the bail-handle depressed to bring the pail-holding arms into position to support the pail from the knees of the milker.

Referring now more particularly to the drawings, wherein like reference-numerals indicate corresponding parts throughout both views, the numeral 1 represents a milk-pail of ordinary or any approved construction, provided, as usual, with the ears 2, in which the bail-handle 3 is pivotally mounted. The bail-handle 3 is preferably constructed, as usual, of stout wire and is provided with the ordinary roller-handle 4. The ends 5 5 of the bail are passed, as usual, through openings in the ears 2 and are extended to form the pail-holding arms 6, which are employed to hold the pail supported from the knees of the milker. Each of these holders is formed by bending the wire at right angles, as at 7, and thence extending the holding-arms at right angles or substantially at right angles to the bail. The holding-arms are preferably curved in segment or hook form to adapt them to snugly embrace the knees, and the free ends thereof are bent or coiled, as shown at 8, to strengthen them. Fig. 1 of the drawings shows the bail-handle elevated into position for use in carrying the pail from place to place. When it is desired to employ the device in milking, the bail-handle is turned down into the position shown in Fig. 2, thus elevating the holding-arms and bringing them into position to be slipped over upon the knees when the pail is placed between the knees of the milker in the ordinary way. By constructing the bail-handle and holding-arms in this manner it will be seen that the construction of the device is considerably cheapened and simplified, that the holding-arms are always in position for use, and that the provision of the same obviates the employment of complicated bands and other holding attachments, as heretofore constructed.

Various changes in the form, proportion, and minor details of construction may be made within the scope of the invention without departing from the spirit or sacrificing any of the advantages of the invention.

Having thus described my invention, what I claim as new therein, and desire to secure by Letters Patent, is—

1. In a milk-pail, the combination with the pail-body provided with ears, of a bail-handle having its ends bent at right angles and journaled in said ears, and thence extended and curved to form segment-shaped arms extending approximately at right angles to the bail, substantially as set forth.

2. In a milk-pail, the combination with the pail-body provided with ears, of a bail-handle having its ends journaled in said ears and extending, and bent to form supporting-arms extending approximately at right angles to the bail, substantially as described.

In testimony whereof I have hereunto set my hand in presence of two subscribing witnesses.

E. J. STILES.

Witnesses:
AUGUSTUS H. WALKER,
EDWARD C. WALKER.